(12) United States Patent
Yu (10) Patent No.: US 12,416,397 B1
(45) Date of Patent: Sep. 16, 2025

(54) ADJUSTABLE LIGHT STAND BOOM ARM

(71) Applicant: Ningbo Yutian Movie and Television Equipment Co., Ltd., Ningbo (CN)

(72) Inventor: Long Yu, Ningbo (CN)

(73) Assignee: Ningbo Yutian Movie and Television Equipmer, Ningbo (CN)

( * ) Notice: Subject to any disclaimer, the term of this patent is extended or adjusted under 35 U.S.C. 154(b) by 0 days.

(21) Appl. No.: 19/074,807

(22) Filed: Mar. 10, 2025

(30) Foreign Application Priority Data

Feb. 15, 2025 (CN) .......................... 202520239492.3

(51) Int. Cl.
*F21V 21/108* (2006.01)
*F16M 11/04* (2006.01)
*F21V 21/116* (2006.01)

(52) U.S. Cl.
CPC ......... *F21V 21/108* (2013.01); *F16M 11/043* (2013.01); *F21V 21/116* (2013.01); F16M 2200/027 (2013.01); F16M 2200/06 (2013.01)

(58) Field of Classification Search
CPC ... F21V 21/108; F21V 21/116; F16M 11/043; F16M 2200/027; F16M 2200/06
See application file for complete search history.

(56) References Cited

U.S. PATENT DOCUMENTS

| | | | | |
|---|---|---|---|---|
| 6,096,956 | A * | 8/2000 | Hoshino | G10D 13/063 84/421 |
| 6,316,706 | B1 * | 11/2001 | Sammons | G10G 5/00 84/421 |
| 7,073,926 | B1 * | 7/2006 | Kremers | F21V 21/22 362/427 |
| 9,208,761 | B2 * | 12/2015 | Miyajima | G10D 13/28 |
| 11,274,786 | B2 * | 3/2022 | Liao | F16B 2/065 |
| 11,293,586 | B1 * | 4/2022 | Kallas | F16M 11/28 |
| 11,988,368 | B1 * | 5/2024 | Harnisch | F21V 21/30 |
| 12,300,199 | B2 * | 5/2025 | May | G10D 13/14 |

(Continued)

FOREIGN PATENT DOCUMENTS

| | | | |
|---|---|---|---|
| CA | 2191022 | A1 * | 11/1996 |
| CA | 3018232 | C * | 2/2020 |

(Continued)

OTHER PUBLICATIONS

Tangxi lighting reflectors brackets, dual wheel reflector support for lighting stand sold on amazon.com dated Apr. 30, 2020 https://www.amazon.com/angxi-Lighting-Reflectors-Reflector-Photography/dp/B087T2GYLW (Year: 2020).*

(Continued)

*Primary Examiner* — Terrell L McKinnon
*Assistant Examiner* — Ding Y Tan (57) ABSTRACT

The invention relates to the technical field of light stand boom arms, and discloses an adjustable light stand boom arm, including supports. An inside of each of the supports is provided with a mounting opening, an inside of the mounting opening is provided with a docking mechanism for docking, and an outside of the support is fixedly connected with a fixed block. In the invention, the connection of the plurality of supports and the change of angles are realized, and an overall length of the supports can be adjusted, thereby improving the practicability of the supports and the efficiency of photography.

4 Claims, 5 Drawing Sheets

(56) References Cited

U.S. PATENT DOCUMENTS

| | | | | |
|---|---|---|---|---|
| 2002/0186998 A1* | 12/2002 | Chen | ............... | F16M 13/022 |
| | | | | 403/97 |
| 2018/0266666 A1* | 9/2018 | Liao | ............ | F21L 14/04 |
| 2024/0301991 A1* | 9/2024 | Wang | ............ | F16M 11/2021 |

FOREIGN PATENT DOCUMENTS

| | | |
|---|---|---|
| CN | 207831112 U | 9/2018 |
| CN | 209246015 U | 8/2019 |
| CN | 216243027 U | 4/2022 |

OTHER PUBLICATIONS

Neewer heavy duty C-stand photography light stand with boom arm, model No. SC172 sold on amazon.com dated Dec. 21, 2023, https://www.amazon.com/Stainless-Photography-Monolight-Reflector-SC172/dp/B0CQQ97T1T?th=1 (Year: 2023).*

Neewer super clamp with stud and spring lock for lighting mount for photography model No. UA017 sold on amazon.com dated Sep. 27, 2023 https://www.amazon.com/NEEWER-Surface-Photography-Lighting-Mounting/dp/B0CJLNH31B?th=1 (Year: 2023).*

* cited by examiner

ADJUSTABLE LIGHT STAND BOOM ARM

CROSS-REFERENCE TO RELATED APPLICATIONS

The application claims priority to Chinese patent application No. 202520239492.3, filed on Feb. 15, 2025, the entire contents of which are incorporated herein by reference.

TECHNICAL FIELD

The invention relates to the technical field of light stand boom arms, and in particular to an adjustable light stand boom arm.

BACKGROUND

Photography has needed suitable light to capture images since its birth. Early photographers could only use natural light or simple fixed light sources. With the development of photography technology, especially with the rise of indoor photography and commercial photography, the demand for artificial light sources is increasing day by day. Light stand boom arms have become important tools for fixing and adjusting photographic lighting, helping photographers to shoot according to their themes and ideas.

A light stand boom arm includes a base, a boom arm, connecting components and a light mounting part. The base is a tripod or a wall-mounted base. The boom arm is telescopic with multiple sections, and is usually made of aluminum alloy. The connecting components include a rotary joint and a locking device. The light mounting part is provided with a general-purpose socket at the top end, and its working principle is based on triangular stability. Through the structural design and material characteristics, the boom arm is capable of bearing the weight of the light and maintaining the overall stability.

The existing boom arm has obvious limitations in lighting application scenarios. In actual operation, when the boom arm needs to be adjusted according to different shooting demands or lighting ranges, the supports cannot be spliced rapidly, making it difficult to flexibly change the overall length of the boom arm. Besides, in terms of angle adjustment, the operation process is complicated and inefficient, so the boom arm cannot make rapid and accurate adjustments according to the actual demand for the lighting angle, which greatly limits the optimization and diversified applications of the lighting effect and lowers the working efficiency and user experience. Therefore, an adjustable light stand boom arm is provided to solve the above problems.

SUMMARY

In order to overcome the defects described above, the invention provides an adjustable light stand boom arm, which aims at alleviating the problem that the length and angle cannot be adjusted rapidly in the prior art.

In order to achieve the above objective, the invention adopts the following technical solution:

An adjustable light stand boom arm includes supports. An inside of each of the supports is provided with a mounting opening, an inside of the mounting opening is provided with a docking mechanism for docking, an outside of the support is fixedly connected with a fixed block, an outside of the fixed block is provided with a mounting mechanism for mounting, an inside of the fixed block is provided with an adjusting mechanism, and an outside of the docking mechanism is provided with a fixing mechanism.

The docking mechanism includes a connecting rod, an outside of the connecting rod is slidably connected to the inside of the mounting opening, the outside of the connecting rod is fixedly connected with a mounting block, the outside of the connecting rod is fixedly connected with a first rotating stud, the outside of the connecting rod is fixedly connected with a first limit block, the outside of the support is provided with a fixing opening, an inside of the fixing opening is threadedly connected with a third rotating stud, and a bottom end of the third rotating stud is in contact with the outside of the connecting rod.

As a further description of the above technical solution:
The fixing mechanism includes a rotating block, an inside of the rotating block is fixedly connected to an outside of the third rotating stud, and an outside of the rotating block is fixedly connected with a control block.

As a further description of the above technical solution:
The mounting mechanism includes a mounting-dismounting block, an outside of the mounting-dismounting block is slidably connected to the outside of the fixed block, the outside of the fixed block is provided with a sliding groove, and an inside of the sliding groove is fixedly connected with a clamping block.

As a further description of the above technical solution:
The adjusting mechanism includes a second rotating stud, an outside of the second rotating stud is threadedly connected to the inside of the fixed block, the outside of the second rotating stud is fixedly connected with a second limit block, an end of the second limit block away from the mounting-dismounting block is fixedly connected with a spring, an end of the second rotating stud away from the mounting-dismounting block is fixedly connected with a rotating cap, and an outside of the second limit block is fixedly connected with a third limit block.

As a further description of the above technical solution:
The inside of the fixed block is provided with a clamping groove, and an outside of the third limit block is slidably connected to an inside of the clamping groove.

As a further description of the above technical solution:
The other end of the spring is fixedly connected to the inside of the fixed block, and the outside of the third limit block is slidably connected to an inner side of the fixed block.

As a further description of the above technical solution:
A top end of the clamping block is in contact with an inside of the mounting-dismounting block, and the clamping block is wedge-shaped.

As a further description of the above technical solution:
The outside of the support is fixedly connected with an anti-collision cushion, and an outside of the first limit block is in contact with the outside of the support.

The Invention has the Following Beneficial Effects

1. In the invention, the position of the connecting rod is fixed by rotating the control block to realize the connection of the plurality of supports and the change of angles, so that the overall length of the supports can be adjusted. With the supports, the length and angles can be adjusted according to needs, thereby reducing the operation time and improving the practicability of the supports and the efficiency of photography.
2. In the invention, the size of the cavity between the fixed block and the mounting-dismounting block is adjusted by rotating the rotating cap, so that photographic instruments with different sizes can be mounted and dismounted rapidly, thereby greatly reducing the preparation time before operation and improving the overall working efficiency.

DESCRIPTION OF REFERENCE SIGNS 1, support; 2, mounting opening; 3, connecting rod; 4, first limit block; 5, mounting block; 6, first rotating stud; 7, anti-collision cushion; 8, fixing opening; 9, fixed block; 10, mounting-dismounting block; 11, second rotating stud; 12, spring; 13, second limit block; 14, rotating cap; 15, third limit block; 16, sliding groove; 17, clamping block; 18, third rotating stud; 19, rotating block; 20, control block.

DETAILED DESCRIPTION OF THE EMBODIMENTS

The technical solutions in the embodiments of the invention will be clearly and completely described below with reference to the accompanying drawings in the embodiments of the invention. It is apparent that the described embodiments are only a part, rather than all of the embodiments of the invention. All other embodiments obtained by those of ordinary skill in the art based on the embodiments of the invention without creative work are within the protection scope of the invention.

Figure 1:
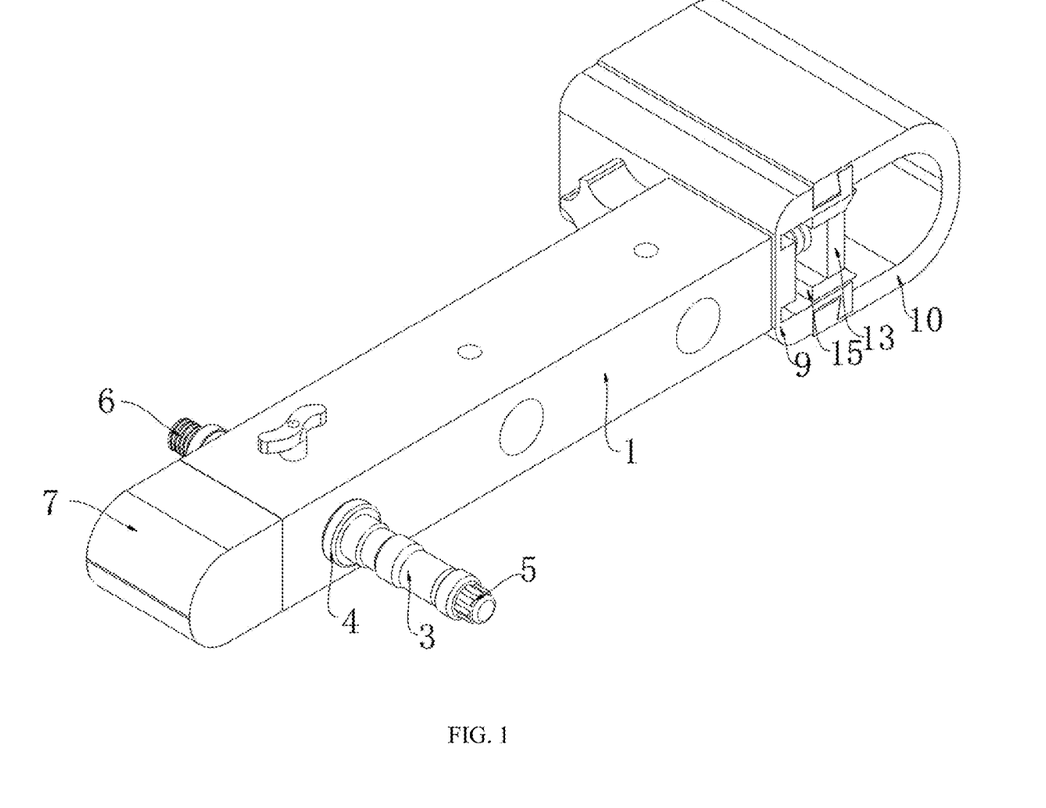
FIG. 1 is a schematic three-dimensional view of an adjustable light stand boom arm according to the invention.
Figure 2:
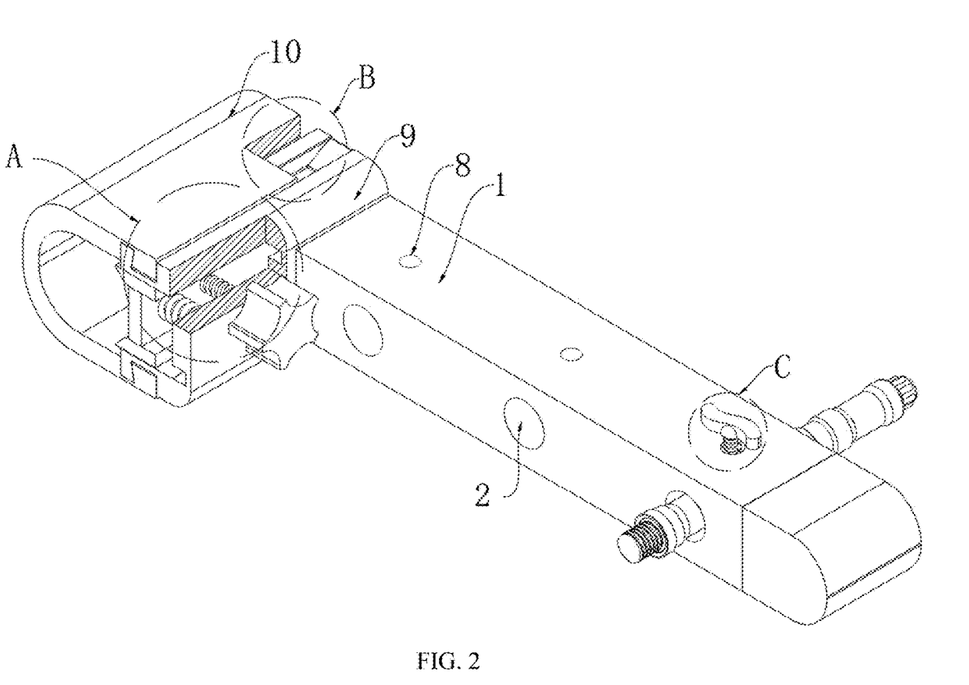
FIG. 2 is a schematic structural view of a mounting opening of the adjustable light stand boom arm according to the invention.
Figure 5:
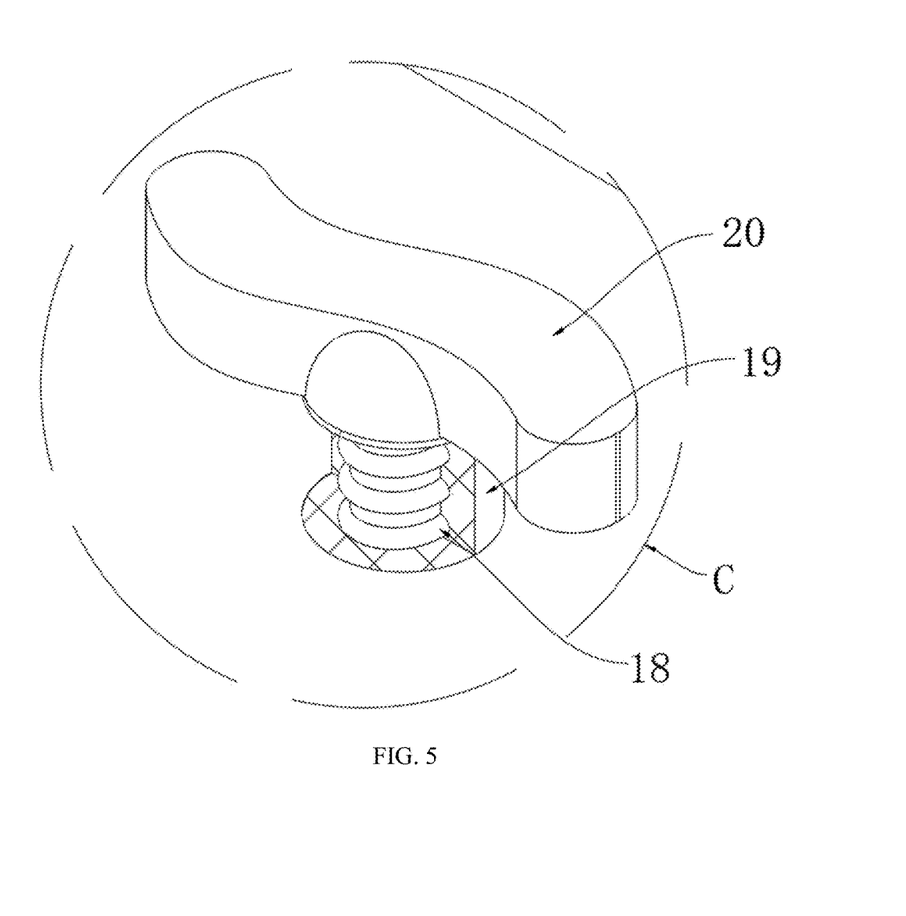
FIG. 5 is an enlarged view of C in FIG. 2.

Referring to FIG. 1, FIG. 2 and FIG. 5, in an embodiment provided by the invention, an adjustable light stand boom arm includes supports 1. As the basic structure of the whole light stand boom arm, the supports 1 provide mounting and supporting platforms for subsequent components. An inside of each of the supports 1 is provided with a mounting opening 2, and the mounting opening 2 is configured to accommodate a connecting rod 3 and provide a sliding space for the connecting rod, so that the supports 1 can be spliced to adjust the length. An inside of the mounting opening 2 is provided with a docking mechanism for docking, and the docking mechanism is capable of realizing connection and docking between the support 1 and other components or between the plurality of supports 1. An outside of the support 1 is fixedly connected with a fixed block 9, and the fixed block 9 is configured to mount and fix other related components and is an important intermediate structure for connecting a photographic instrument with the support 1. An outside of the fixed block 9 is provided with a mounting mechanism for mounting, and the mounting mechanism is capable of realizing rapid mounting and dismounting of the photographic instrument on the fixed block 9. An inside of the fixed block 9 is provided with an adjusting mechanism, and the adjusting mechanism is capable of adaptively fastening the photographic instrument mounted on the fixed block 9 according to the size of the photographic instrument. An outside of the docking mechanism is provided with a fixing mechanism, and the fixing mechanism is capable of ensuring a firm connection of the docked support 1.

The docking mechanism includes the connecting rod 3, and an outside of the connecting rod 3 is slidably connected to the inside of the mounting opening 2, so that an operator can slide the connecting rod 3 in the mounting opening 2 according to actual needs, thereby adjusting the overall length of the supports 1. The outside of the connecting rod 3 is fixedly connected with a mounting block 5, and the mounting block 5 is configured to mount a lighting facility so as to meet lighting demands in different scenarios. The outside of the connecting rod 3 is fixedly connected with a first rotating stud 6, and the first rotating stud 6 may be configured to connect other supports 1 such that the plurality of supports 1 can be used in combination. The outside of the connecting rod 3 is fixedly connected with a first limit block 4, and the first limit block 4 can limit a sliding range of the connecting rod 3 in the mounting opening 2, thereby ensuring the maximum mounting length of the connecting rod 3. The outside of the support 1 is provided with a fixing opening 8, and the fixing opening 8 provides a mounting position for a third rotating stud 18 such that the position of the connecting rod 3 can be fixed.

An inside of the fixing opening 8 is threadedly connected with the third rotating stud 18, and a bottom end of the third rotating stud 18 is in contact with the outside of the connecting rod 3. By rotating the third rotating stud 18, its bottom end can abut against the connecting rod 3, thereby fixing the position of the connecting rod 3. The fixing mechanism includes a rotating block 19, and an inside of the rotating block 19 is fixedly connected to an outside of the third rotating stud 18. The rotating block 19 can drive the third rotating stud 18 to rotate so as to fix or loosen the connecting rod 3. Tn outside of the rotating block 19 is fixedly connected with a control block 20, and with the control block 20, the operator can manually rotate the rotating block 19 conveniently, which makes the operation more convenient. The outside of the support 1 is fixedly connected with an anti-collision cushion 7, and the anti-collision cushion 7 can prevent the support 1 from colliding with other objects during use, causing damage. An outside of the first limit block 4 is in contact with the outside of the support 1 so as to limit the sliding range of the connecting rod 3, thereby ensuring the adjustment stability of the support 1.

Figure 4:
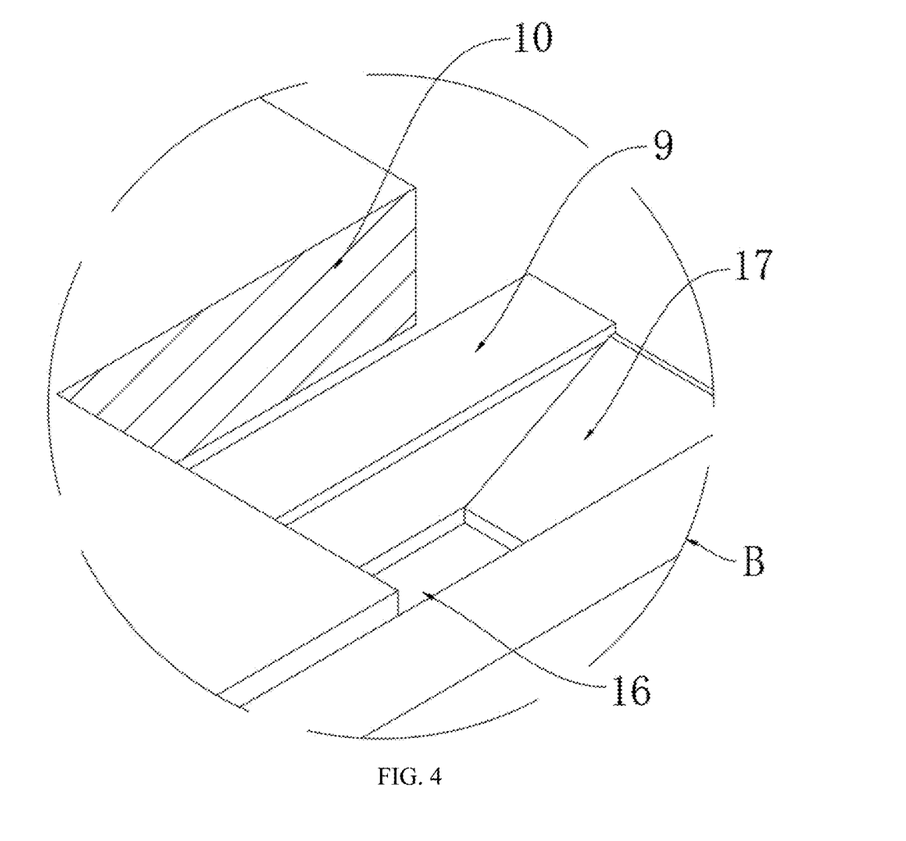
FIG. 4 is an enlarged view of B in FIG. 2.

Referring to FIG. 1, FIG. 2 and FIG. 4, the mounting mechanism includes a mounting-dismounting block 10, and an outside of the mounting-dismounting block 10 is slidably connected to the outside of the fixed block 9. Through the cooperation between the mounting-dismounting block 10 and the fixed block 9, the photographic instrument can be mounted and dismounted rapidly. The outside of the fixed block 9 is provided with a sliding groove 16, and the sliding groove 16 provides a track for the sliding of the mounting-dismounting block 10, thereby ensuring smooth sliding of the mounting-dismounting block. An inside of the sliding groove 16 is fixedly connected with a clamping block 17, and the clamping block 17 can play a certain role in positioning and limiting the mounting-dismounting block 10. A top end of the clamping block 17 is in contact with an inside of the mounting-dismounting block 10, and the clamping block 17 is wedge-shaped. With this shape design, the mounting-dismounting block 10 can slide in the sliding groove 16 conveniently and be clamped with the clamping block 17 at a proper position.

Figure 3:
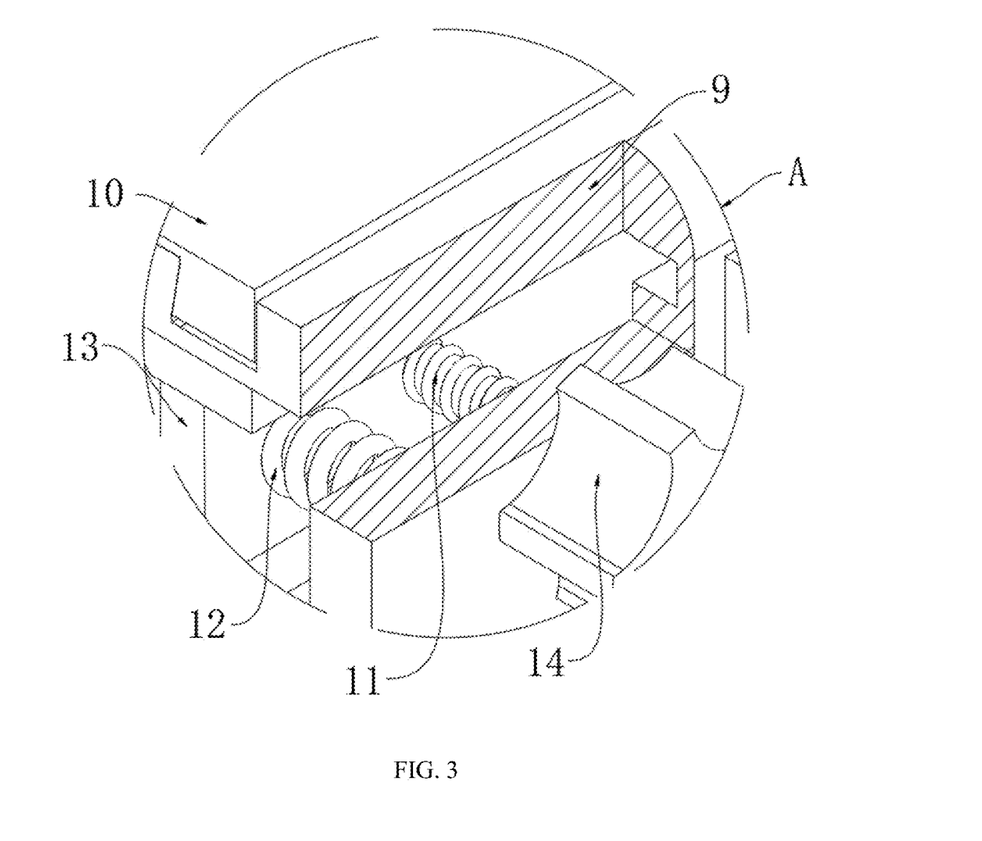
FIG. 3 is an enlarged view of A in FIG. 2.

Referring to FIG. 1 to FIG. 3, the adjusting mechanism includes a second rotating stud 11, and an outside of the second rotating stud 11 is threadedly connected to the inside of the fixed block 9, so that the second rotating stud 11 can move in the fixed block 9 when rotating. The outside of the second rotating stud 11 is fixedly connected with a second limit block 13, and the second limit block 13 moves with the second rotating stud 11 so as to push and fix the photographic instrument. An end of the second limit block 13 away from the mounting-dismounting block 10 is fixedly connected with a spring 12, and the spring 12 may provide an elastic support for the second limit block 13, so that the second limit block 13 can be closely attached to the photographic instrument. An end of the second rotating stud 11 away from the mounting-dismounting block 10 is fixedly connected with a rotating cap 14, and with the rotating cap 14, the operator can manually rotate the second rotating stud 11 conveniently so as to operate the adjusting mechanism. An outside of the second limit block 13 is fixedly connected with a third limit block 15, and the third limit block 15 and the second limit block 13 can work together to fix the photographic instrument. The inside of the fixed block 9 is provided with a clamping groove, and an outside of the third limit block 15 is slidably connected to an inside of the clamping groove. The clamping groove provides a sliding track for the third limit block 15 so as to ensure the moving stability of the third limit block. The other end of the spring 12 is fixedly connected to the inside of the fixed block 9, thereby providing an elastic restoring force for the whole adjusting mechanism. The outside of the third limit block 15 is slidably connected to an inner side of the fixed block 9, thereby ensuring the third limit block 15 to move stably in the fixed block 9.

Working principle: When an operator wants to mount a photographic instrument, by rotating the rotating cap 14, the second rotating stud 11 can drive the whole second limit block 13 to slide inside the fixed block 9 and the mounting-dismounting block 10. Thus, the size of the cavity between the fixed block 9 and the mounting-dismounting block 10 can be adjusted, so that photographic instruments with different sizes can be mounted. After the adjustment is completed, the outside of the photographic instrument is slid into the cavity between the fixed block 9 and the mounting-dismounting block 10. At this time, by rotating the rotating cap 14 reversely, the second rotating stud 11 can push the second limit block 13 and the third limit block 15 to be closely attached to the outside of the photographic instrument, thereby completing rapid mounting of the photographic instrument. Then, by rotating the rotating cap 14 reversely, the photographic instrument can be dismounted rapidly. Through the rapid mounting and dismounting of the photographic instruments with different sizes, the preparation time before operation can be reduced. With simple operation techniques, the working efficiency is finally improved.

During shooting, the adjustment of the overall length of the supports 1 and the mounting of the lighting facility to the support 1 can be realized according to needs. The connecting rod 3 can be adjusted and controlled to slide inside different mounting openings 2 according to needs so as to adapt to different use demands. After the adjustment of the connecting rod 3 is completed, by rotating the control block 20, the rotating block 19 can drive the third rotating stud 18 to limit the position of the connecting rod 3, so that the connecting rod 3 can be fixedly connected to the support 1. In this case, the lighting facility can be mounted through the mounting block 5, and the other supports 1 can be mounted through the first rotating stud 6. When a plurality of supports 1 are to be connected through the connecting rods 3, the angle may be adjusted first, and then the control block 20 is rotated for fixation. In this way, the rapid angle adjustment is realized according to different use demands. Moreover, the mounting length of the connecting rod 3 can be adjusted according to needs. The maximum mounting length is at the position of the first limit block 4. Through rapid docking and angle adjustment between the supports 1, the practicability of the supports 1 is improved. In addition, the adjustable light stand boom arm is simple to operate and easy to use, thereby improving the overall working efficiency.

It should be finally noted that the above is only preferred embodiments of the invention and is not intended to limit the invention. Although the invention has been described in detail with reference to the foregoing embodiments, those skilled in the art can still modify the technical solutions recorded in the above embodiments, or make equivalent replacements on part of technical features. Any modification, equivalent replacement, or improvement made within the spirit and principle of the invention shall fall into the protection scope of the invention.

What is claimed is:

1. An adjustable light stand boom arm, comprising supports, wherein an inside of each of the supports is provided with a mounting opening, an inside of the mounting opening is provided with a docking mechanism for docking, an outside of the support is fixedly connected with a fixed block, an outside of the fixed block is provided with a mounting mechanism for mounting, an inside of the fixed block is provided with an adjusting mechanism, and an outside of the docking mechanism is provided with a fixing mechanism; and the docking mechanism comprises a connecting rod, an outside of the connecting rod is slidably connected to the inside of the mounting opening, the outside of the connecting rod is fixedly connected with a mounting block, the outside of the connecting rod is fixedly connected with a first rotating stud, the outside of the connecting rod is fixedly connected with a first limit block, the outside of the support is provided with a fixing opening, an inside of the fixing opening is threadedly connected with a third rotating stud, and a bottom end of the third rotating stud is in contact with the outside of the connecting rod;

wherein the mounting mechanism comprises a mounting-dismounting block, an outside of the mounting-dismounting block is slidably connected to the outside of the fixed block, the outside of the fixed block is provided with a sliding groove, and an inside of the sliding groove is fixedly connected with a clamping block;

wherein the adjusting mechanism comprises a second rotating stud, an outside of the second rotating stud is threadedly connected to the inside of the fixed block, the outside of the second rotating stud is fixedly connected with a second limit block, an end of the second limit block away from the mounting-dismounting block is fixedly connected with a spring, an end of the second rotating stud away from the mounting-dismounting block is fixedly connected with a rotating cap, and an outside of the second limit block is fixedly connected with a third limit block;

wherein the inside of the fixed block is provided with a clamping groove, and an outside of the third limit block is slidably connected to an inside of the clamping groove;

wherein a top end of the clamping block is in contact with an inside of the mounting-dismounting block, and the clamping block is wedge-shaped.

2. The adjustable light stand boom arm according to claim 1, wherein the fixing mechanism comprises a rotating block, an inside of the rotating block is fixedly connected to an outside of the third rotating stud, and an outside of the rotating block is fixedly connected with a control block.

3. The adjustable light stand boom arm according to claim 1, wherein the other end of the spring is fixedly connected to the inside of the fixed block, and the outside of the third limit block is slidably connected to an inner side of the fixed block.

4. The adjustable light stand boom arm according to claim 1, wherein the outside of the support is fixedly connected with an anti-collision cushion, and an outside of the first limit block is in contact with the outside of the support.

* * * * *